UNITED STATES PATENT OFFICE.

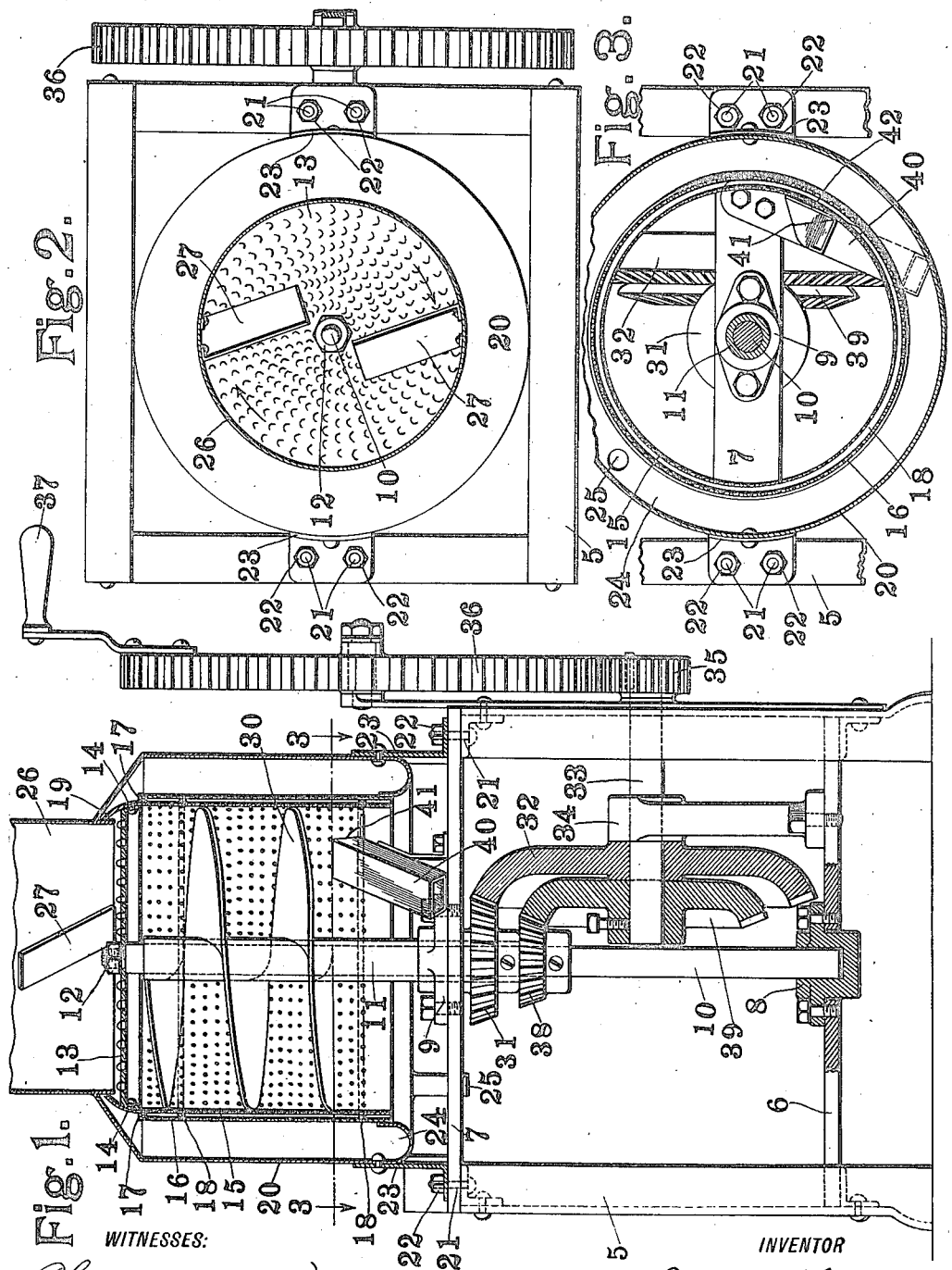

OSCAR MORATH, OF ST. LOUIS COUNTY, MISSOURI.

CENTRIFUGAL SEPARATOR.

1,170,554.  Specification of Letters Patent.  Patented Feb. 8, 1916.

Application filed February 11, 1915. Serial No. 7,480.

*To all whom it may concern:*

Be it known that I, OSCAR MORATH, a citizen of the United States of America, residing in the county of St. Louis, State of Missouri, have invented a certain new and useful Centrifugal Separator, of which the following is such a full, clear, and exact description as will enable any one skilled in the art to which it appertains to make and use the same, reference being had to the accompanying drawings, forming part of this specification.

My invention relates to a centrifugal machine for separating liquids from solids and, in the form shown, it is adapted to separate cider from apple pulp. Many features of my invention, however, may be applied to different forms of centrifugal separating machines.

In the accompanying drawings, which illustrate a cider mill made in accordance with my invention, Figure 1 is partly a side elevation and partly a vertical section; Fig. 2 is a top plan view; and Fig. 3 is a section taken on the line 3—3 of Fig. 1.

Like marks of reference refer to similar parts in the several views of the drawings.

5 represents a rectangular frame-work forming the support for the machine. Carried by this frame-work 5 is a lower cross bar 6 and an upper cross bar 7 carrying the bearings 8 and 9 respectively. Stepped in the bearing 8 is the lower end of a vertical shaft 10, the upper end of which passes through a sleeve 11, which sleeve is journaled in the bearing 9. The upper end of the shaft 10 projects beyond the end of the sleeve 11 and has secured to it by means of a nut 12 a disk-shaped grater 13. This disk-shaped grater has secured to it by means of bolts or rivets 14 a cylindrical member 15 preferably made of thin metal and perforated so as to form a sieve or screen. Surrounding the cylindrical member 15 is a second cylindrical member 16 which is also perforated and which is adapted to be removed from the member 15 in order to clean the device, as will be hereinafter more fully described. Lugs 17 on the member 16 prevent the member 16 from dropping down over the member 15. The two members 15 and 16 are separated by any suitable means, as for instance, the wire rings 18, best shown in Fig. 1. The member 15 is provided with an imperforate portion 19 projecting above the grater 13 so as to prevent any substance from falling between the part 15 and the outer shell 20. This outer shell 20 is secured to the cross bar 7 by means of bolts 21 and nuts 22, these bolts and nuts engaging brackets 23 secured to the shell 20. The lower edge of the shell 20 is curved upwardly, as shown at 24, so as to form a trough extending around the interior of the shell. This trough is of such size as to just slip over the outer cylindrical member 16. The trough 24 is provided at any suitable point in its circumference with a discharge pipe 25 through which the cider is discharged. The upper end of the shell 20 is formed into a hopper 26 adapted to receive the apples. Secured in this hopper 26 are a pair of plates 27 which act as stops to hold the apples in position to be acted upon by the grater 13. These stops 27, which are preferably two in number, are so arranged, as best shown in Fig. 2, as to extend inwardly in an approximately radial direction and to slant downwardly at a considerable angle, as best shown in Fig. 1.

Arranged within the cylinder 15 and carried by the sleeve 11 is a spiral conveyer 30. This spiral conveyer 30 is of such size as to just fit within the cylinder 15. On the lower end of the sleeve 11 is a gear wheel 31 which meshes with a gear wheel 32 upon the shaft 33 mounted in a bearing 34 carried on the cross bar 6 and provided with a small pinion 35 meshing with a large gear wheel 36 provided with a handle 37. The shaft 10 is provided with a gear wheel 38 meshing with a gear wheel 39 secured to the shaft 33 and rotating with the gear wheel 32. The ratio between the gear wheels 31 and 32 is slightly less than that between the gear wheels 38 and 39 so that while the cylinders 15 and 16 and the spiral conveyer 30 are rotated in the same direction, the cylinders will be rotated at a slightly greater speed. The effect of this will be the same as though the cylinders were stationary and the conveyer 30 rotated slowly in a direction opposite to that indicated by the arrows in Fig. 2. The spiral conveyer 30 will, therefore, operate to slowly move the material within the cylinders downwardly along their perforated walls. The speed at which this moving of the material is accomplished, together with the length of the cylinder, is so regulated as to insure the entire removal of the cider from the apple pulp before the same has reached the lower end of the cylinder.

Carried by the cross bar 7 is a discharge spout or chute 40, the vertical edge 41 of which is adapted to bear against the inner face of the inner cylinder 15 and thus remove the pulp and discharge the same out of the machine. The discharge chute 40 is also provided with a horizontal flange 42 to catch any of the pulp which might otherwise drop downwardly through the bottom of the machine.

The operation of my apparatus is as follows: The apples are fed into the hopper 26 and the wheel 36 is rotated by means of the handle 37. The apples are wedged against the under face of the stops 27. The action of the grater 13 is to comminute the apples and discharge the product into the inner cylinder 15. As the cylinders, as well as the conveyer 30, are rotating at a high speed, the material will be held against the side walls of the cylinder by centrifugal force and the cider will pass through the openings of both cylinders and into the space between the shell 20 and the cylinders, whence it will run down into the trough 24 and be discharged from the pipe 25. As has been heretofore described, the action of the conveyer 30 is such as to move the pulp downwardly along the walls of the cylinder until it reaches the lower end whence it is discharged through the discharge chute 40. The action of this discharge chute 40, as well as the action of the conveyer 30, will force some of the pulp through the interior cylinder 15. Any such portions, however, will be caught by the outer cylinder 16 and prevented from falling into the trough 24 and being discharged with the cider.

When it is desired to clean the machine, the nuts 22 are removed from the bolts 21 so that the shell 20, together with the hopper 26, may be lifted off the machine. After this, the outer cylinder 16 is drawn upwardly over the inner cylinder 15 so as to allow any pulp which has entered the space between the two cylinders to be removed. The machine may thus be thoroughly cleaned.

Having fully described my invention, what I claim as new and desire to secure by Letters-Patent of the United States is:

1. In a centrifugal machine for separating liquids from solids, the combination with a rotary cylindrical foraminous container, of a rotary grater forming one end of said cylindrical container for comminuting the material, and means for collecting the liquid passing through the walls of said container.

2. In a cider mill, the combination with a rotary container for the pulp, of a conveyer for moving the pulp through the said container, a discharge chute for the pulp, and a pair of scraping edges, one arranged to receive the material from said container and the other from the said conveyer.

3. In a cider mill, the combination with a rotary container for the pulp, the said container consisting of an inner perforate cylinder, an outer perforate cylinder removably surrounding the said first named cylinder, and a ledge on one of said cylinders and engaging with the other to limit the relative longitudinal movement of the cylinders.

In testimony whereof, I have hereunto set my hand and affixed my seal in the presence of the two subscribing witnesses.

OSCAR MORATH. [L. S.]

Witnesses:
W. A. ALEXANDER,
G. M. SHORE.